United States Patent Office 2,799,292
Patented July 16, 1957

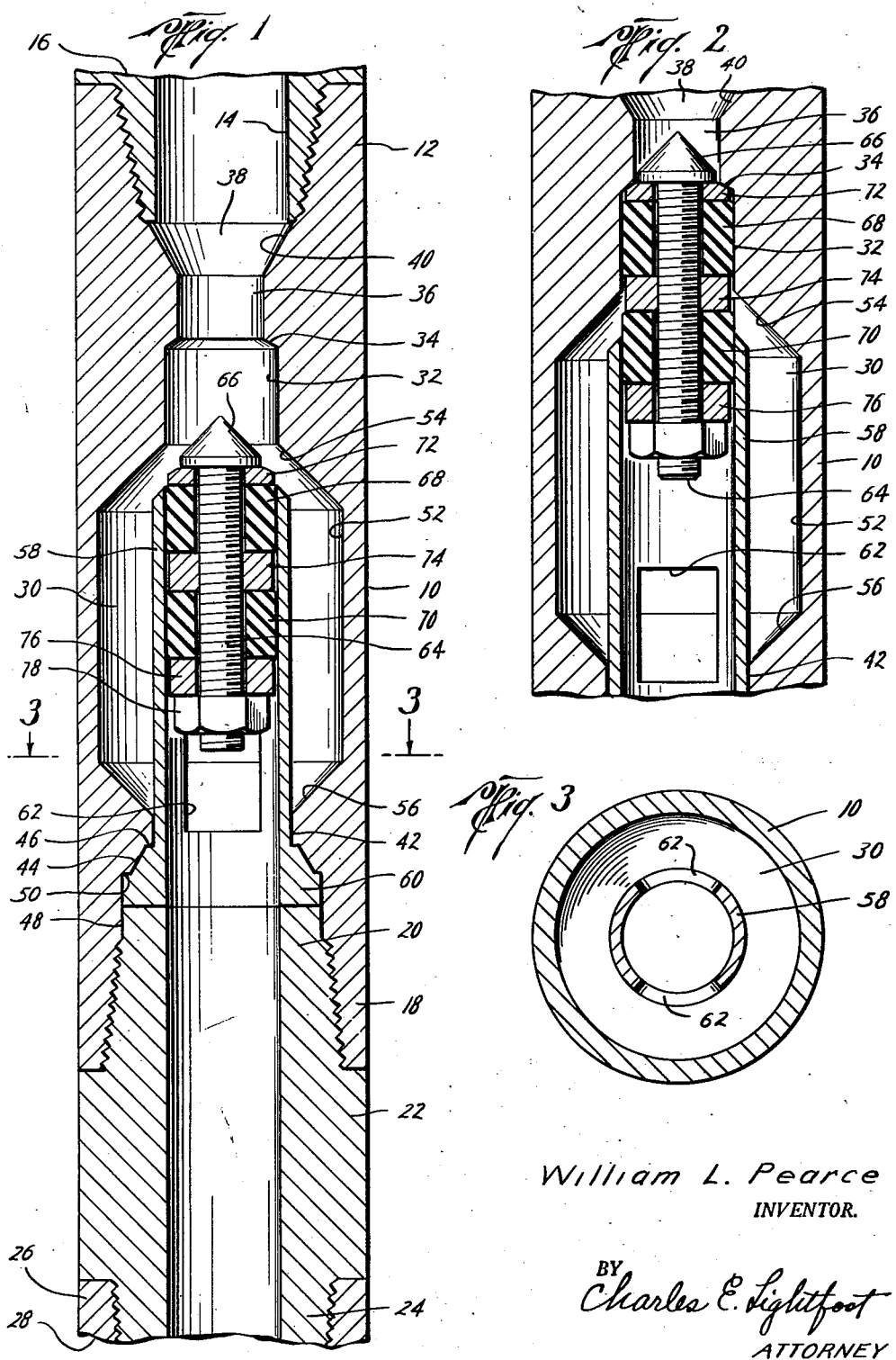

2,799,292

DRILL STEM VALVE

William L. Pearce, Houston, Tex.

Application March 28, 1955, Serial No. 497,249

3 Claims. (Cl. 137—498)

This invention relates to a drill stem valve, and more particularly to a valve means which is adapted to be incorporated in a tubular drill stem for use in the drilling of wells and which is operable by an upward flow of fluid upon the occurrence of an increase in the pressure of fluid in the stem to close the stem.

The invention is an improvement of the drill stem valve described and claimed in my application, Serial No. 434,122, filed June 3, 1954.

While not limited to such use, the invention finds particular application in connection with the drilling of oil and gas wells, wherein a tubular drill stem is employed, and drilling fluid is circulated down through the stem and upwardly about the same during the drilling operation. During such drilling operations the drilling fluid is forced downwardly through the stem by means of a slush pump whose outlet is connected to the stem through a drilling hose having a swivel connection with the upper end of the stem, and the fluid then returns upwardly about the exterior of the stem.

In the event that gas under high pressure should be encountered in the well in carrying out drilling operations in this manner, the pressure of fluid in the drill stem may be suddenly increased to an extent to cause the drilling hose to burst or to injure the pump valves.

The present invention has for its chief object the overcoming of the above disadvantages by the provision of means adapted to be incorporated in a drill stem and which will be effective upon the occurrence of a sudden increase in the upward pressure of fluid in the stem to close the stem against the upward flow of fluid therethrough.

Another object of the invention is to provide a drill stem valve of improved construction which will remain open to permit the downward flow of drilling fluid through the stem during the drilling operation, but which is operable by an upsurge of fluid in the stem due to an increase in the pressure therein to close the stem against the upward flow of fluid therethrough.

A further object of the invention is the provision of a drill stem valve which is adapted to remain in an open condition to permit downward or upward flow of fluid through the stem under normal conditions of operation but which is operable upon the occurrence of blow-out conditions in the well to close the stem against an up-flow of fluid therein.

Another object of the invention is to provide a drill stem valve which is operable solely by the pressure of fluid in the stem, which operates upon the occurrence of an upsurge of fluid in the stem to close the stem and which is operable by the application of a downward pressure in the stem to move the valve to open position.

A further object of the invention is the provision of a drill stem valve including a plunger movably mounted in the stem for movement to one position to open the valve to permit the flow of fluid through the stem and to another position to close the stem against such flow and including seal forming means which is enclosed and protected against abrasion or other injury in both positions of the plunger.

Another object of the invention is to provide a drill stem valve having a cylinder mounted in the interior of the stem and about which fluid may flow through the stem, and including a plunger movable in the cylinder and having seal forming means enclosed in the cylinder when the valve is in open position, the plunger being movable to a position extending beyond the cylinder with the seal forming means in sealing position between the plunger and the interior of the stem when the valve is in closed position.

A still further object of the invention is the provision of a drill stem valve of simple design and rugged construction, having no portion which protrudes beyond the exterior of the drill stem, and which is capable of long withstanding the extreme conditions of hard usage and exposure to which devices of this kind are customarily subjected.

The above and other important objects and advantages of the invention will best be understood from the following detailed description constituting a specification of the same when considered in conjunction with the annexed drawings, wherein—

Figure 1 is a vertical, central, cross-sectional view illustrating a preferred embodiment of the invention, and showing the same connected into a tubular drilling string with the valve in open position;

Figure 2 is a view similar to that of Figure 1, showing the valve in closing position; and Figure 3 is a cross-sectional view taken along line 3—3 of Figure 1, looking in the direction indicated by the arrows.

Referring now to the drawings in greater detail, the invention comprises a tubular valve casing 10 having an internally threaded box portion 12 at its upper end adapted to be threadably connected to the lower externally threaded end portion 14 of an upper section 16 of a tubular drilling string or stem. The casing 10 also has an internally threaded box portion 18 at its lower end adapted to be threadably connected to the upper externally threaded end portion 20 of a tubular connector member 22, whose lower end is externally threaded as indicated at 24 to receive the upper internally threaded end 26 of a lower section 28 of the tubular drilling string or stem.

Mediate its ends the casing 10 is formed with an internally enlarged portion 30 forming a valve chamber, which terminates at its upper end in a counterbore 32 whose upper end forms a beveled, downwardly facing annular shoulder 34. A bore 36, which is of smaller diameter than the counterbore 32, communicates at its lower end with the counterbore 32 and at its upper end with a bore 38. The bore 38 has an upwardly and radially outwardly inclined peripheral wall 40, and communicates at its upper end with the interior of the box portion 12.

The valve chamber 30 terminates at its lower end in a bore 42, which communicates at its lower end with a bore 44 having a downwardly and radially outwardly inclined peripheral wall. A downwardly facing annular shoulder 46 is formed between the lower end of the bore 42 and the upper end of the bore 44. The lower end of the bore 44 is in communication with the upper end of a bore 48, which is of larger diameter than the bore 42 and which communicates at its lower end with the interior of the box portion 18. A downwardly facing annular shoulder 50 is formed between the lower end of the bore 44 and the upper end of the bore 48.

A valve chamber 30 has a peripheral wall 52 which is cylindrical throughout a major portion of its length, and which is inclined upwardly and radially inwardly at 54, adjacent its upper end, and is inclined downwardly and radially inwardly at 56, adjacent its lower end. A cylindrical valve guide and housing member 58, which is open at its ends, is positioned in the chamber 30 in radially spaced relation to the peripheral wall 52 of the chamber 30 and in axial alignment with the counterbore 32 and the bore 36. The cylindrical member 58 has an outside diameter corresponding to the diameter of the bore 42, and has an enlarged lower end portion 60 which has exterior surfaces corresponding to the bores 44 and 48 and the shoulders 46 and 50 for engagement therewith when the cylindrical member 58 is inserted upwardly through the bore 42. The cylindrical member 58 may be secured in place by abutment of the lower end portion 60 against the upper end 20 of the connector member 22.

Within the cylindrical member 58 a plunger is movably positioned for longitudinal movement inwardly and outwardly through the upper open end thereof to open and close the valve, as hereinafter described. The upper end of the cylindrical member 58, which is closed by the plunger, is spaced below the upper end of the chamber 30, and a plurality of ports 62 are formed in the cylindrical member 58 above the lower end of the chamber 30 and below the plunger. Thus when the valve is in its open position, as shown in Fig. 1, drilling muds and well fluids may be caused to flow in either direction through the chamber 30, around the upper end of the cylindrical member 58 and through the ports 62.

The plunger comprises a bolt 64 which is aligned axially with the cylindrical member 58. The bolt 64 has an enlarged, pointed head 66 at its upper end and is threaded throughout its length. A pair of packing rings, numbered 68 and 70, which are formed of resilient material such as rubber, surround the bolt 64 and are positioned one above the other. The diameter of the packing rings 68 and 70 is such that they fit tightly within the cylindrical member 58, the inside diameter of which corresponds to the diameter of the counterbore 32. A washer 72 surrounds the bolt 64 and is positioned between the pointed head 66 and the uppermost packing ring 68. A ring 74, which is threaded internally for engagement with the threads of the bolt 64, is applied to the bolt 64 between the packing rings 68 and 70. The ring 74 is tightened on the bolt 64 sufficiently to maintain the uppermost packing ring 68 and the washer 72 firmly in engagement with the pointed head 66. A washer 76 is applied to the bolt 64 below the lowermost packing ring 70, and a nut 78 is applied to the lower end of the bolt 64. The nut 78 is tightened on the bolt 64 whereby the lowermost packing ring 70 is expanded so that it grips the inner wall of the cylindrical member 58 sufficiently to resist movement of the plunger in either direction, as hereinafter described.

The uppermost packing ring 68 is of a size to fit tightly within the counterbore 32, to form a fluid tight seal between the plunger and the interior of the casing 10, when the valve is in closed position as seen in Figure 2. The diameter of the pointed head 66 corresponds to that of the bore 36, while the washer 72 is of larger diameter and has a beveled peripheral edge for engagement with the shoulder 34 to limit the upward movement of the plunger into the counterbore 32.

As best seen in Figure 1, the length of the plunger is such that when the valve is in open position the packing rings 68 and 70 are enclosed in the cylindrical member 58 and the upper end of the uppermost packing ring 68 is substantially covered by the pointed head 66 and the washer 72, so that the packing rings are protected against abrasion or other damage due to contact with the well fluid or drilling mud. When the valve is in closed position as illustrated in Figure 2, it will be seen that the uppermost packing ring 68 is disposed entirely within the counterbore 32 of the casing 10, while the lowermost packing ring 70 remains within the cylindrical member 58, so that the packing rings are again protected from wear or other injury due to contact with the well fluid or drilling mud.

In making use of the invention, constructed as described above, the plunger may be positioned within the cylindrical member 58 and the nut 78 may be tightened on the bolt 64 whereby the lowermost packing ring 70 is expanded to such extent that it grips the inner wall of the cylindrical member 58 sufficiently to resist a predetermined pressure acting upon the plunger to move it longitudinally in either direction. The cylindrical member 58, with the plunger in place, may then be inserted in the chamber 10, through the bore 42, and the upper end of the connector member 22 may be threadably connected to the lower end of the casing 10 to complete the valve assembly. The valve then may be theadably connected to the lower end of the upper section 16, and the upper end of the lower section 28, of the drill stem.

In this condition of the equipment, the valve is in its open position, as illustrated in Figure 1, with the plunger in its retracted position, in which the uppermost packing ring 68 is enclosed within the cylindrical member 58. It will be apparent that during the drilling operation drilling mud may be pumped downwardly through the drill string, passing about the upper portion of the cylindrical member 58 and through the ports 62, and on down through the drill string. If desired the drilling fluid or well fluid may be permitted to flow upwardly through the drilling string without moving the plunger upwardly to its extended position, to close the valve, but upon the occurrence of blowout conditions in the well, an upsurge or sudden increase in the upward pressure of the fluid in the string will cause the plunger to move upwardly out of the cylindrical member 58 to the closed position illustrated in Figure 2, wherein the uppermost packing ring 68 extends into the counterbore 32 of the casing 10 while the lowermost packing ring 70 remains in sealing contact with the interior of the cylindrical member 58. In this position of the plunger the washer 72 will engage the shoulder 34 to limit the upward movement of the plunger, while the ring 74 will close the lower end of the counterbore 32 and the upper end of the cylindrical member 58 to maintain the packing rings 68 and 70 out of contact with the well fluid below.

It will be seen that the packing rings 68 and 70 are maintained in a protected position, in either position of the valve, to effectively prevent abrasion or other injury thereto due to contact with the drilling mud or well fluid. The valve may be readily moved from its closed position to its open position by pumping downwardly through the drill stem to overcome the upward pressure of the fluid beneath the valve body and the resistance of the packing rings 68 and 70 to movement, which limits the downward movement of the plunger after it has reached the position shown in Fig. 1.

The cylinder 58, the bolt 64, the washers 72 and 76, the ring 74 and the nut 78 are preferably formed of hardened, abrasion resistant material, whereby wear on these parts will be reduced to a minimum, thus assuring a long lasting structure which is economical in manufacture, and wherein the parts are easily replaced when necessary.

It will also be apparent that the valve casing 10 and the connector member 22 may have an external diameter substantially equal to that of the drill string, so that no portion of the equipment will be larger than the drill string, thus avoiding any obstruction in the well bore.

It will thus be seen that the invention provides a drill stem valve of improved construction which operates automatically to close the drill stem against the upward flow of fluid therethrough, upon the occurrence of blowout conditions in the well, and which is readily operated by the application of downward fluid pressure in the drill string to move the valve to open position when desired.

While the invention has been disclosed herein in connection with a certain specific embodiment of the same, it will be understood that this is intended by way of illustration only, and that numerous changes may be made in the construction and arrangement of the various parts without departing from the spirit of the invention or the scope of the appended claims.

Having thus clearly shown and described the invention, what is claimed as new and desired to secure by Letters Patent is:

1. A valve assembly comprising a tubular valve casing having an internally enlarged portion intermediate its ends forming a valve chamber, the valve chamber terminating at its upper end in a counterbore, a cylindrical valve guide and housing member, open at its ends, positioned in the valve chamber in radially spaced relation to the peripheral wall of the chamber and an axial alignment with the counterbore, and a plunger received within the cylindrical member and movable from a retracted position, in which it is disposed substantially entirely within the cylindrical member, to an extended position in which it is disposed partly in and in frictional engagement with the cylindrical member and partly in and in frictional engagement with the counterbore, the upper end of the cylindrical member being closed by the plunger and being spaced below the upper end of the valve chamber and one or more ports being formed in the cylindrical member above the lower end of the valve chamber and below the lowermost position of the plunger so that fluid may flow in either direction around the upper end of the cylindrical member, and through the ports, when the plunger is in its retracted position.

2. A valve assembly comprising, a tubular valve casing having an internally enlarged portion intermediate its ends forming a valve chamber, the valve chamber terminating at its upper end in a counterbore and at its lower end in a second bore aligned axially with the counterbore, the upper end of the counterbore terminating in a third bore of smaller diameter and comprising the smaller of a series of passages communicating with the upper end of the casing, the lower end of the second bore terminating in a fourth bore of larger diameter and comprising the smaller of a series of passages communicating with the lower end of the casing, a cylindrical valve guide and housing member, open at its ends, positioned in the valve chamber in radially spaced relation to the peripheral wall of the chamber and in axial alignment with the counterbore, the cylindrical member having an outside diameter corresponding to the diameter of the second bore and having an enlarged lower end portion for engagement with the upper end of the fourth bore when the cylindrical member is inserted upwardly through the bore, the cylindrical member extending upwardly through the second bore and being secured in place by abutment of its lower end against the upper end of the connector member, and a plunger received within the cylindrical member and movable from a retracted position, in which it is disposed substantially entirely within the cylindrical member, to an extended position in which it is disposed partly in and in frictional engagement with the interior of the cylindrical member and partly in and in friction engagement with the interior of the counterbore, the upper end of the cylindrical member being closed by the plunger and being spaced below the upper end of the valve chamber, and one or more ports being formed in the cylindrical member above the lower end of the valve chamber and below the lowermost position of the plunger so that fluid may flow in either direction around the upper end of the cylindrical member, and through the ports, when the plunger is in its retracted position.

3. In a valve assembly as described in claim 2, a plunger comprising a bolt aligned axially with the cylindrical member and positioned with its head uppermost, a pair of resilient packing rings surrounding the bolt and positioned one above the other, the diameter of the packing rings being such that they fit tightly within the cylindrical member or the counterbore, depending upon the position of the valve, a washer surrounding the bolt and positioned between the head of the bolt and the uppermost packing ring, a ring threaded internally for engagement with the threads of the bolt and positioned between the packing rings, the ring being adapted to be tightened on the bolt sufficiently to maintain the uppermost packing ring and the washer firmly in engagement with the head of the bolt, a washer applied to the bolt below the lowermost packing ring, and a nut applied to the lower end of the bolt and adapted to be tightened on the bolt whereby the lowermost packing ring is expanded so that it grips the inner wall of the cylindrical member sufficiently to resist a predetermined force acting upon the plunger to move it longitudinally in either direction, the arrangement being such that the packing rings are fully enclosed within the cylindrical member or the counterbore, depending upon the position of the valve.

References Cited in the file of this patent
UNITED STATES PATENTS

| | | |
|---|---|---|
| 391,431 | Shoff | Oct. 23, 1888 |
| 1,196,926 | Brown | Sept. 5, 1916 |
| 1,593,519 | Underwood | July 20, 1926 |
| 2,571,497 | Stewart | Oct. 16, 1951 |
| 2,675,021 | Allin | Apr. 13, 1954 |